US009185575B2

(12) United States Patent
Brisebois (10) Patent No.: US 9,185,575 B2
(45) Date of Patent: Nov. 10, 2015

(54) SYSTEMS AND METHODS FOR PROMOTING USE OF WIRELESS SERVICES EXCLUSIVELY

(75) Inventor: Arthur Richard Brisebois, Cumming, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 611 days.

(21) Appl. No.: 12/943,215

(22) Filed: Nov. 10, 2010

(65) Prior Publication Data

US 2011/0059737 A1 Mar. 10, 2011

Related U.S. Application Data

(63) Continuation of application No. 11/689,193, filed on Mar. 21, 2007, now Pat. No. 7,853,244.

(51) Int. Cl.
*H04W 4/00* (2009.01)
*H04W 24/02* (2009.01)
*H04W 48/18* (2009.01)
*G06Q 30/02* (2012.01)
*H04H 60/21* (2008.01)
*H04H 60/46* (2008.01)
*H04H 60/65* (2008.01)
(Continued)

(52) U.S. Cl.
CPC ........... *H04W 24/02* (2013.01); *G06Q 30/0203* (2013.01); *G06Q 30/0206* (2013.01); *H04H 60/21* (2013.01); *H04H 60/46* (2013.01); *H04H 60/65* (2013.01); *H04M 1/24* (2013.01); *H04M 15/43* (2013.01); *H04M 15/51* (2013.01); *H04M 15/58* (2013.01); *H04M 15/80* (2013.01); *H04W 48/18* (2013.01); *H04H 60/91* (2013.01); *H04W 36/0022* (2013.01); *H04W 48/20* (2013.01); *H04W 72/085* (2013.01)

(58) Field of Classification Search
CPC ........... H04W 4/24; H04W 4/00; H04W 4/26; H04W 68/00; H04W 48/18; H04W 8/18; H04W 76/02; H04W 16/18; H04W 24/04; H04W 24/08; H04W 36/30; H04W 36/0022; H04W 48/20; H04W 72/02; H04W 72/085; H04M 15/00; H04M 15/88; H04M 15/85; H04M 15/58; H04M 2215/22; H04M 2215/8158; H04M 17/10; H04M 2215/0192; H04M 2215/81; H04M 2215/32; H04M 2215/2026; H04M 15/80; H04M 15/8038; H04M 2215/0152; H04M 2215/7442; H04M 2215/0116
USPC ................ 455/405–409, 414.1, 432.1, 432.2, 455/435.1–435.3, 436–439; 379/114.01, 379/114.06, 114.1, 114.12, 114.13, 114.27, 379/121.02, 127.05
See application file for complete search history.

(56) References Cited

U.S. PATENT DOCUMENTS

5,659,601 A * 8/1997 Cheslog .................... 379/121.02
6,574,465 B2 * 6/2003 Marsh et al. .................. 455/406
(Continued)

*Primary Examiner* — Olumide T Ajibade Akonai
(74) *Attorney, Agent, or Firm* — Parks Wood LLC (57) ABSTRACT

Provided herein are systems and methods for providing exclusive wireless service proposals to subscribers. A method for providing an exclusive wireless service proposal to a subscriber includes the steps of conducting measurements of at least one metric; sending measurement data acquired during the step of conducting to a measurement analysis machine (MAM), the MAM being configured to analyze the measurement data; analyzing the measurement data; predicting performance of at least one of wireless voice and wireless data services based upon the results of the analysis step; generating a proposal for exclusive wireless services based upon the measurement data and the performance prediction; and providing the proposal to a subscriber. Systems for performing this and additional or alternative methods are also disclosed.

23 Claims, 8 Drawing Sheets

(51) Int. Cl.
  *H04M 1/24*  (2006.01)
  *H04M 15/00*  (2006.01)
  *H04W 48/20*  (2009.01)
  *H04W 72/08*  (2009.01)
  *H04W 36/00*  (2009.01)
  *H04H 60/91*  (2008.01)

(56) References Cited

U.S. PATENT DOCUMENTS

| | | | |
|---|---|---|---|
| 6,606,377 B2 * | 8/2003 | Ruckart et al. | 379/121.02 |
| 7,324,963 B1 * | 1/2008 | Ruckart | 705/14.1 |
| 7,420,920 B2 * | 9/2008 | True et al. | 370/235 |
| 7,493,114 B2 * | 2/2009 | Lee et al. | 455/422.1 |
| 7,609,678 B2 * | 10/2009 | Sharma et al. | 370/338 |
| 8,005,726 B1 * | 8/2011 | Bao | 705/27.1 |
| 2002/0039892 A1 * | 4/2002 | Lindell | 455/151.1 |
| 2004/0047324 A1 * | 3/2004 | Diener | 370/338 |
| 2004/0076143 A1 | 4/2004 | Lee | |
| 2004/0198360 A1 * | 10/2004 | Kotzin | 455/445 |
| 2006/0246958 A1 * | 11/2006 | Benco et al. | 455/567 |
| 2007/0142060 A1 * | 6/2007 | Moton et al. | 455/456.1 |
| 2009/0036116 A1 | 2/2009 | Kim et al. | |
| 2009/0191858 A1 * | 7/2009 | Calisti et al. | 455/422.1 |

* cited by examiner

SYSTEMS AND METHODS FOR PROMOTING USE OF WIRELESS SERVICES EXCLUSIVELY

CROSS REFERENCE TO RELATED APPLICATIONS

This application is a continuation of U.S. patent application Ser. No. 11/689,193, filed Mar. 21, 2007, and issued Dec. 14, 2010, as U.S. Pat. No. 7,853,244, the entirety of which is incorporated herein by reference.

TECHNICAL FIELD

The present invention relates generally to telecommunications, and more particularly, to providing exclusive wireless service proposals to current and potential wireless service subscribers.

BACKGROUND OF THE INVENTION

Technology convergence is apparent in most technology fields. In telecommunications, the effects of technology convergence are readily apparent due to the large number of people affected. For example, services once provided solely by landline service providers are now offered through wireless service providers. As a result, many consumers have cancelled their landline telephone service in favor of using their wireless mobile device as their primary means for voice communication. Other consumers have sought high-speed Internet access from cable or satellite companies as their primary means for data communication and still use their wireless mobile device as their primary means for voice communication.

With newer wireless communications equipment and more sophisticated processing techniques, consumers now have access to higher bandwidth data connections as provided by wireless service providers. More recently, with the advent of high-speed data access protocols such as Evolution-Data Optimized (EV-DO), High-Speed Downlink Packet Access (HSDPA), High-Speed Uplink Packet Access (HSUPA), and High-Speed Orthogonal Frequency-Division Multiplexing (OFDM) Packet Access (HSOPA), consumers have the ability to transfer data at speeds close to that of landline services.

Increasingly, the consumer is inundated with the number of individual service providers needed to acquire the bundle of services related to fixed and mobile voice and data communications. Ultimately, many consumers would prefer to have a single provider and bill for all of their services. Meanwhile, wireless service providers would like to penetrate the potential market of in-home voice and data services further, but a number of consumers would prefer to retain their wireline service as a safety measure in the event they do not have reliable in-home wireless coverage. Others retain their wireline telephone service for dial-up Internet service or just out of habit.

Despite potential market resistance, modern wireless networks with adequate coverage can provide consumers' in-home voice and data needs. In addition, money spent on wireline services is often a redundant expense from a consumer's perspective, and results in lost revenue potential for wireless service providers. Both of these concerns can be alleviated if the wireless service provider can efficiently and cost-effectively measure a consumer's at-home coverage, and predict voice and data reliability and savings for the consumer prior to the consumer disconnecting their wireline services. Accordingly, methods and systems are provided herein by which a wireless service provider can efficiently and cost-effectively measure a locations wireless coverage, and predict voice and data reliability, voice quality, and data throughput at that location.

SUMMARY OF THE INVENTION

The various embodiments of the present invention overcome the deficiencies of the prior art by providing systems and methods for providing an exclusive wireless service proposal to a subscriber. In one embodiment, a method in accordance with the present invention includes the steps of: conducting measurements of at least one metric; sending measurement data acquired during the step of conducting to a measurement analysis machine (MAM), the MAM being configured to analyze the measurement data; analyzing the measurement data; predicting performance of at least one of wireless voice and wireless data services based upon the results of the analysis step; generating a proposal for exclusive wireless services based upon the measurement data and the performance prediction; and providing the proposal to a subscriber. In some embodiments, the step of analyzing includes a wireless capability analysis (WCA); the WCA is used to determine if at least one of network availability, network reliability, and data throughput are within specifications set by a wireless service provider or a third party. If during the WCA it is determined that the results of are within the specifications, then a value added analysis (VAA) is performed. The VAA can include a subscriber view and a service provider view. The subscriber view includes a calculation of a wireless-only service benefit and a subscriber cost benefit; and, the service provider view includes a calculation of a wireless-only subscriber retention rate, a wireless-only subscriber revenue, and a wireless service provider revenue benefit.

In another embodiment, if during the WCA it is determined that the results of are not within the specifications, then a network augment analysis (NAA) is performed. The NAA can include the steps of: compiling a WCA result database and determining if the subscribers associated with the WCA results are concentrated or dispersed in location. If the subscribers are concentrated, then a cell planning step can be performed. If the subscribers are dispersed, then a subscriber site planning step can be performed. In some embodiments, after the NAA is performed, a VAA is performed.

If it is determined that the provision of exclusive wireless services is mutually beneficial for both the subscriber and the wireless service provider, then the proposal can be generated and provided to the subscriber. If it is determined that the provision of exclusive wireless services is not mutually beneficial for both the subscriber and the wireless service provider, then tuning subscriber profile specifications to further filter the subscriber data.

A computer-readable medium including computer-executable instructions which, when executed, perform the steps of the aforementioned method is also provided.

A system for providing an exclusive wireless service proposal to a subscriber is also provided. The system includes a user equipment (UE) in communication with a radio access network (RAN) and a core network (CN) in communication with the RAN. The core network includes a measurement analysis machine (MAM) and a billing system. The MAM includes at least one database for storing at least one of subscriber data, measurement data, analysis results, and other pertinent data, and is configured to perform at least one of: receive and analyze subscriber data; schedule measurement sessions; schedule survey sessions; provide instructions to the RAN to conduct the measurement sessions and the survey sessions; receive measurement data; create trace calls; perform wireless capability analysis; perform value added analysis; perform network augment analysis; determine if providing exclusive wireless services to the subscriber is mutually beneficial for the subscriber and a wireless service provider; and generate an exclusive wireless service proposal. The billing system is in communication with the MAM and is configured to store and maintain at least one of subscriber contracts, subscriber account statuses, and subscriber usage patterns.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word exemplary is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
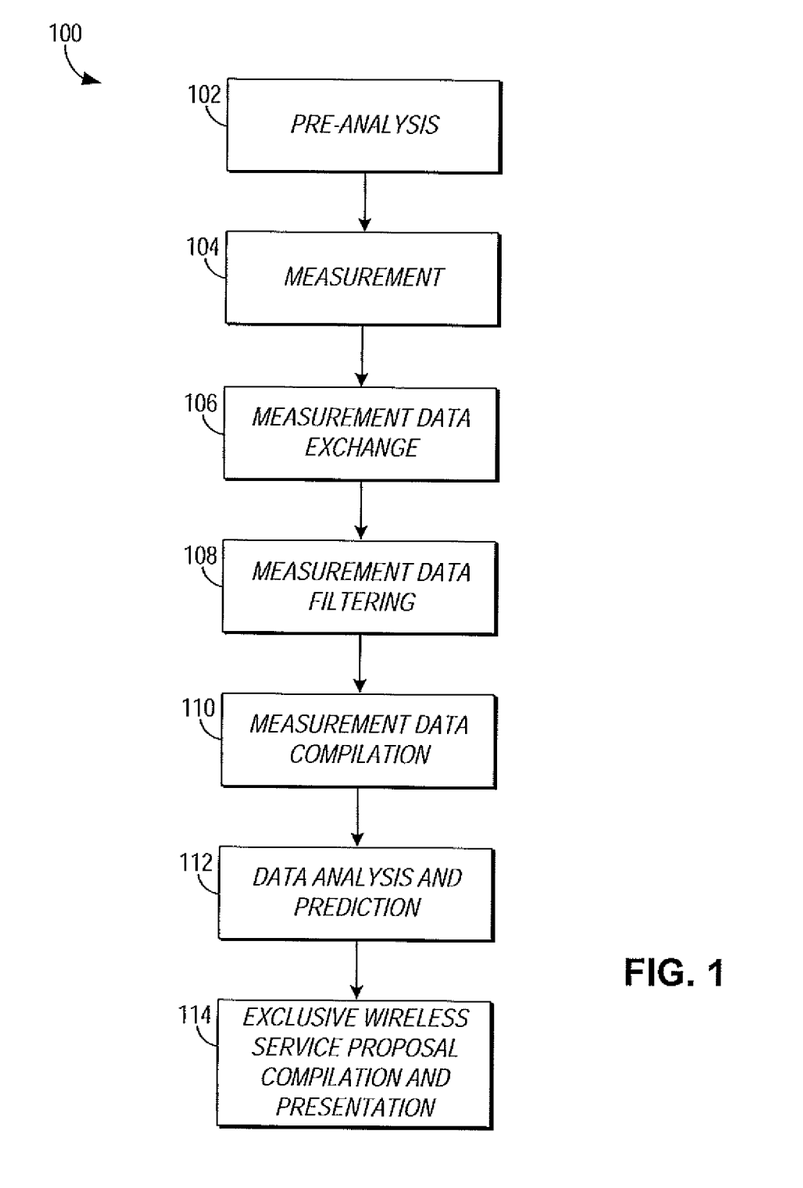
FIG. 1 illustrates an exemplary flow diagram of a method to provide exclusive wireless service proposals to wireless service subscribers, according to the present invention.

Referring now to the drawings in which like numerals represent like elements throughout the several views, FIG. 1 illustrates an exemplary flow diagram of a method 100 for providing exclusive wireless service proposals to subscribers in accordance with an embodiment of the present invention. The present invention is applicable to current wireless subscribers that have wireline service for voice and/or data in addition to their wireless plan(s) with a wireless service provider. The present invention is also applicable to potential subscribers that currently rely exclusively upon wireline solutions for their voice and data needs. The present invention is further applicable to current wireless subscribers and potential subscribers that have acquired or that are planning to acquire voice and/or data services at a new service address. As used herein, the term service address is used to identify an address that is associated with a subscriber's account. Accordingly, a subscriber may have more than one service address; for example, a home service address and an office service address. As used herein, the term subscriber refers to both current and potential (future) subscribers at an established service address and/or at a non-established service address.

It should be understood that the illustrated method 100 is not limited to the steps shown nor the order of the steps shown and is provided solely as a basis for teaching an embodiment of the present invention. Accordingly, amendments to the method 100 and to the other methods described herein (see FIGS. 2-5) may be made to achieve like results and still be within the scope of the present invention.

The method 100 begins at pre-analysis step 102. The pre-analysis step 102 is primarily responsible for filtering available subscriber data to identify if one or more subscribers are suitable for wireline service replacement. By way of example for current subscribers, the data can be voice usage such as the number of minutes used in a selected period of time, data usage such as the number of bytes transferred in a selected period of time, and/or billing data. This information can be extracted from the appropriate database(s) and filtered according to criteria set forth by the wireless service provider. A software program(s) can be developed to filter the subscriber data based upon the filter criteria. In some instances, the subscriber data filter criteria may be provided and/or the filtering process may be performed by a third party.

During the pre-analysis step 102, the wireless service provider may choose to conduct an analysis of potential subscribers (e.g., current wireline-exclusive subscribers). In one embodiment, the wireless service provider may provide a survey to the potential subscriber to determine if they are a suitable candidate for exclusive wireless services. Specific questions or details that outline the survey can be provided by the wireless service provider during implementation, or alternatively by a third party. In addition or as an alternative to a survey, the wireless service provider can send qualified personnel out to the service address of the potential subscriber to determine if the potential subscriber is a suitable candidate for exclusive wireless services. This may be accomplished by obtaining measurements of the signal strength, signal quality, and data throughput of the wireless signal at the potential subscriber's service address, for example. If the measurements do not meet or exceed the wireless service provider's specifications, hardware such as a signal amplifier or a signal filter may be installed in or on the potential subscriber's service address in an effort to increase signal strength, improve signal quality, and increase data throughput to meet such specifications. In an alternative embodiment, this step is performed during a measurement step, step 104.

After the pre-analysis step 102, the method 100 proceeds to measurement step 104. At step 104, measurements during one or more measurement sessions are conducted. Multiple measurement sessions may be used to ensure that the measurement data is accurate and precise.

In one embodiment, measurement sessions are conducted remotely during at-home hours. It should be understood that the terms at-home and in-home are used herein to refer to when a subscriber is at any service address whether an actual home or not. At-home hours may be determined, for example, by a survey to the subscriber. The survey can be provided to the subscriber via a call, an email, an instant message, a text message, a multimedia message, or via standard mail. An analysis of the voice usage and/or data usage when the subscriber is at a service address as verified via at least one location determining technique can be used to determine at-home hours. The at least one location determining technique, can be, for example, a global positioning system (GPS), an assisted-GPS (A-GPS), triangulation techniques, any combination thereof, or other location determining techniques known in the art.

Measurement sessions can be handset-based or network-based. Handset-based measurements can utilize software applications to record signal quality, signal strength, and/or other metrics as determined by the wireless service provider. Network-based measurements can be conducted via an autonomous test call and/or via a network trace. Other known measurement methods may be used.

After measurements are conducted in step 104, the method 100 proceeds to data exchange step 106. At step 106, the data obtained in measurement step 104 is sent back to the network for further analysis. In one embodiment, the subscriber's handset forwards the data to the network via a Short Message System (SMS) message or other methods of uplink data transmission. In another embodiment, a mobile assisted handover measurement report or other form of network-based call measurement as received by the network element is used to obtain in-call reporting of signal level and quality. In addition, the subscriber may be contacted and asked to rate the quality of the signal. Due to the subjective nature of voice quality, the data supplied in the subscriber's response may be used at the discretion of the wireless service provider. Other methods may be used to obtain the measurement data.

After the data exchange step 106, the method 100 proceeds to step 108 wherein the measurement data is filtered. Measurement data from multiple sessions may be requested and filtered. The measurement data filter criteria can be established by the wireless service provider. A software program can be developed to filter the measurement data. In some embodiments, the wireless service provider may outsource the measurement data filtering duties to a third party.

After the measurement data is filtered at step 108, the method 100 proceeds to step 110 wherein the measurement data is aggregated and converted for analysis. The conversion step can be used to compile a data table independent of the data type acquired during data exchange step 106. By way of example and not limitation, an SMS message containing measurement data and/or a call trace log can be converted to a data table. The data table(s) compiled in step 110 is used in a data table analysis and prediction step, step 112.

At step 112, the data table(s) are analyzed to predict in-home performance for both voice and data services. By way of example and not limitation, the measurement data and/or survey results can be used to predict retainability, voice quality, data throughput, and/or any other pertinent metrics. Through this analysis, the wireless service provider is able to establish a confidence factor for a particular subscriber. The confidence factor is used to ultimately determine whether the subscriber is a suitable candidate for exclusive wireless services. The confidence factor and various analyses are described with reference to FIGS. 2-5.

After step 112, the method 100 proceeds to step 114 wherein an exclusive wireless service proposal is compiled and presented to the subscriber. The exclusive wireless service proposal can be presented to the subscriber via an email, a standard mail, a text message, a multimedia message, a bill insert, a call, or a like method. The exclusive wireless service proposal can contain a comparison of the subscriber's service address voice performance and quality to a typical wireline solution. In some embodiments, the comparison may be made directly to the subscriber's current wireline solution. The exclusive wireless service proposal can also contain a comparison of the subscriber's service address data performance and quality to a typical wireline solution such as dial-up, digital subscriber line (DSL), cable, or the like, and/or a comparison of 2G, 3G, and/or higher generation wireless data solutions. In addition, the subscriber's current cost associated with their wireline or wireline/wireless solution can be compared to an exclusive wireless solution.

Figure 2:
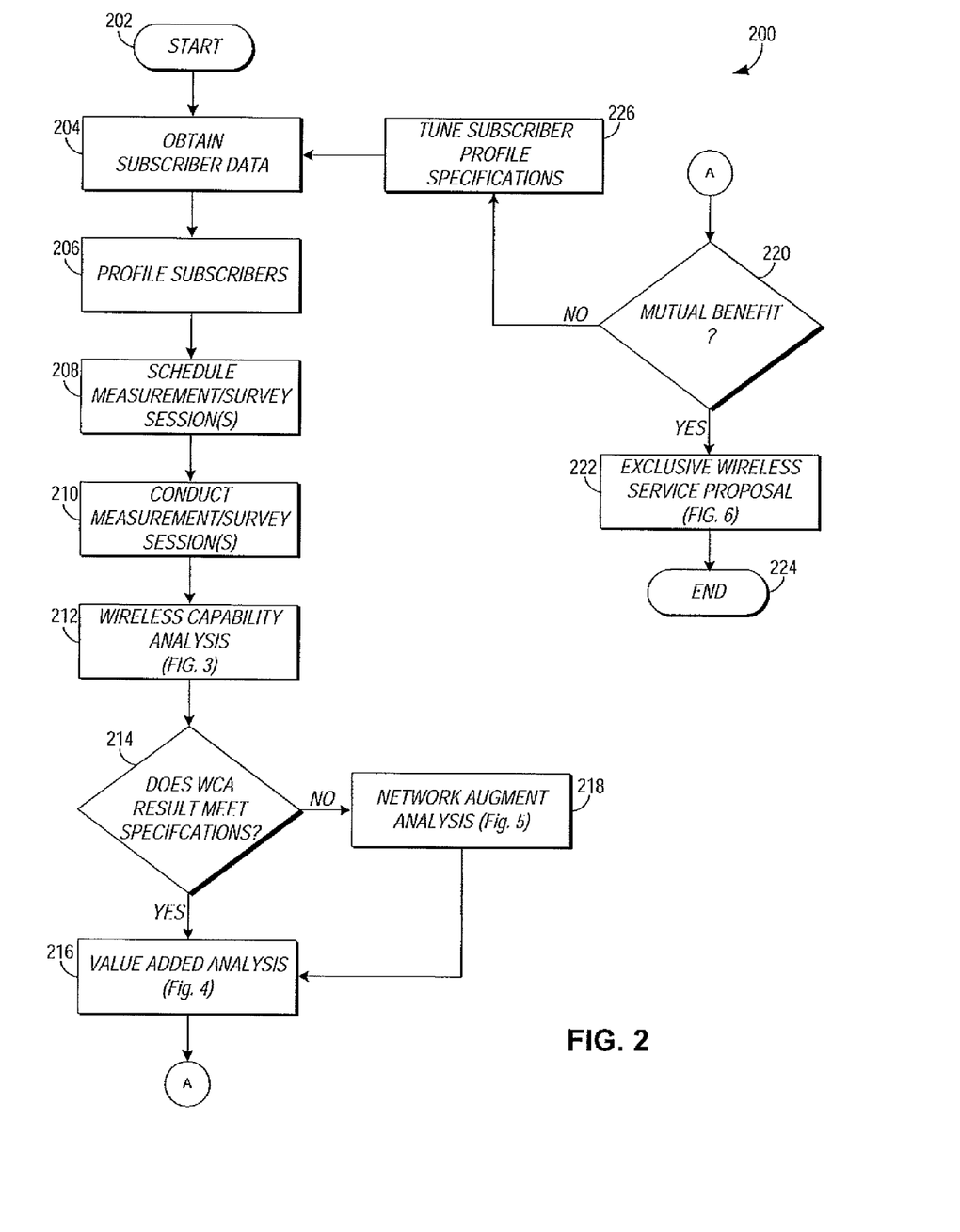
FIG. 2 illustrates an exemplary flow diagram of a detailed method to provide exclusive wireless service proposals to wireless service subscribers, according to the present invention.

Referring now to FIG. 2, an exemplary flow diagram of a detailed method 200 for providing exclusive wireless service proposals to subscribers in accordance with an embodiment of the present invention is shown. The method 200 begins at step 202 and proceeds to step 204, wherein subscriber data is obtained. The subscriber data can be voice usage such as the number of minutes used in a selected period of time, data usage such as the number of bytes transferred in a selected period of time, and/or billing data.

At step 204, the wireless service provider may choose to conduct an analysis of potential subscribers (e.g., current wireline-exclusive subscribers). In one embodiment, the wireless service provider may provide a survey to the potential subscriber to determine if they are a suitable candidate for exclusive wireless services. Specific questions or details that outline the survey can be provided by the wireless service provider during implementation. In an alternative embodiment, the survey is generated and/or provided by a third party. In addition or as an alternative to a survey, the wireless service provider can send qualified personnel out to a service address of the potential subscriber to determine if the potential subscriber is a suitable candidate for exclusive wireless services. This may be accomplished, for example, by obtaining measurements of the signal strength, signal quality, and data throughput of the wireless signal at the potential subscriber's service address. If the measurements do not meet or exceed the wireless service provider's specifications, hardware such as a signal amplifier or a signal filter may be installed in or on the potential subscriber's service address in an effort to increase signal strength, signal quality, and data throughput to meet such specifications.

After subscriber data is obtained at step 204, the method 200 proceeds to step 206 wherein the subscribers are profiled. Subscriber profiles can be generated from subscriber data that has been filtered by the wireless service provider and/or a third party. Priority schemes may be used to prioritize subscribers based upon their profiles. For example, the wireless service provider may want to filter subscribers that do not readily use their current wireline data service because potential data revenue from these subscribers would be low. Other priority schemes are also contemplated.

After the subscribers are profiled in step 206, at least one measurement and/or survey session is scheduled in step 208.

In one embodiment, the measurement and/or survey sessions are scheduled during at-home hours. In step 210, the at least one measurement and/or survey session is conducted and signal strength, signal quality, data throughput and/or other metrics are measured.

Figure 3:
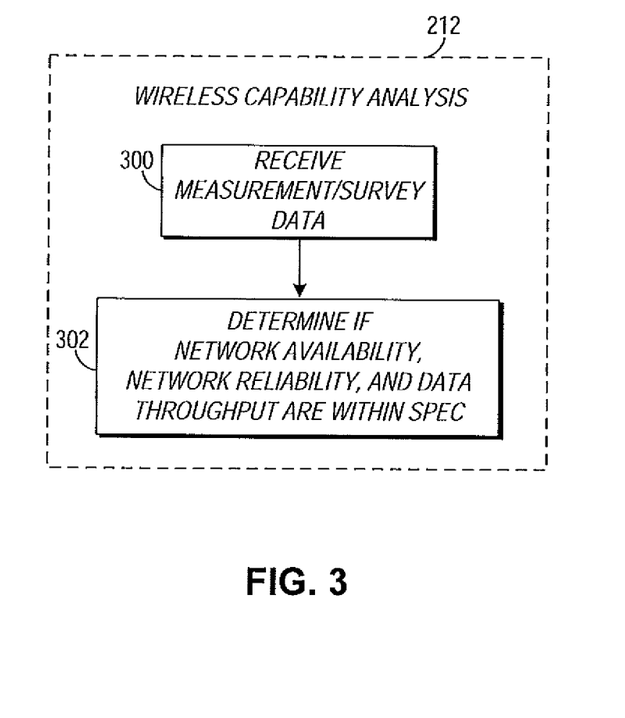
FIG. 3 illustrates an exemplary flow diagram of a wireless capability analysis, according to the present invention.

Referring now briefly to FIG. 3, a wireless capability analysis (step 212) is shown. The wireless capability analysis (WCA) 212 is used to determine if exclusive wireless services are capable of being provided to a selected subscriber. The WCA 212 begins at step 300, wherein measurement/survey data acquired during step 210 is received. At step 302, the measurement/survey data is used to determine if network availability, network reliability, and data throughput are within the specifications of the wireless service provider. It is contemplated that additional or alternative metrics can also be used.

Referring back to FIG. 2, after the WCA step 212, the method 200 proceeds to decision step 214 and it is determined if the WCA results meet the requirements (specifications) of the wireless service provider. If the results do meet (or in some cases exceed) the requirements, the method 200 proceeds to step 216 and a value added analysis is performed. The value added analysis step 216 is described below with reference to FIG. 4.

Figure 4:
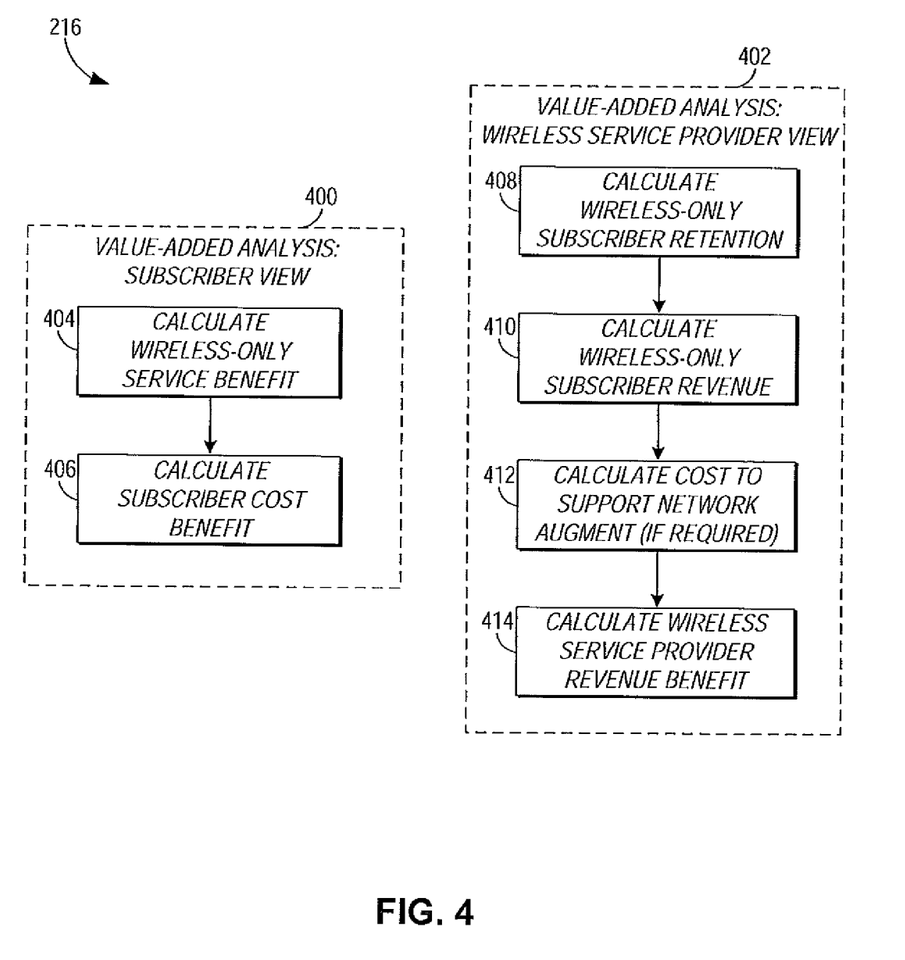
FIG. 4 illustrates an exemplary flow diagram of a subscriber view and a wireless service provider view of a value-added analysis, according to the present invention.

Referring now to FIG. 4, the illustrated value added analysis step 216 is divided into a subscriber view 400 and a wireless service provider view 402. In general, the value added analysis step 216 is used to determine if exclusive wireless services for a particular subscriber or group of subscribers would mutually benefit both the subscriber and the wireless service provider. It should be understood that the individual steps used in the subscriber view 400 and the wireless service provider view 402 are not limited to the order shown and should not likewise be interpreted.

The subscriber view 400 is used to evaluate the benefit of exclusive wireless services for the subscriber. Wireless exclusive services afford the subscriber many benefits including increased mobility, continuous connectivity, superior data rates, and potentially reduced costs when compared to dial-up and some broadband connections. Wireless exclusive benefits can be calculated based upon an analysis of measurement/survey data on a per subscriber basis or a per subscriber profile type basis. Ultimately, the subscriber must decide whether these and other benefits that exclusive wireless services provide warrant the upgrade or transition from their current wireline solutions. However, it is valuable for the wireless service provider to make the subscriber aware of benefits, some of which may be specific to their service address because of their location (e.g., increased signal strength of wireless over distance-dependent broadband connections such as DSL) or other reasons. A calculation of such benefits is illustrated in step 404. At step 406, the wireless service provider can calculate subscriber cost benefit of exclusive wireless services versus exclusive wireline services and/or wireless and wireline services. Data for this calculation can be obtained during step 204, for example.

The wireless service provider view 402 of the value added analysis step 216 is used to evaluate the benefit of providing wireless exclusive services for the wireless service provider. At step 408, the wireless service provider calculates wireless-exclusive subscriber retention rates. The retention rates can be calculated from subscriber billing data acquired during step 204, for example. At step 410, the wireless service provider calculates wireless-exclusive subscriber revenue.

In some instances, the wireless service provider will need to augment a network to provide exclusive wireless services to subscribers that may reside in low signal areas or for other reasons such as bandwidth concerns. The costs associated with such an augment need to be taken into consideration. Accordingly, step 412 is used to calculate costs of any network augment such as the addition, removal, or upgrade of the current network components. The cost may be calculated from software programs configured to perform network planning functions. In addition or alternatively, the cost may be manually calculated. This calculation is most appropriate when a network augment analysis 218 has been performed.

At step 414, the wireless service provider determines the overall benefit in view of potential revenue that could be generated from providing exclusive wireless services to the subscribers.

Referring back to FIG. 2, if at step 214 it is determined that the result of the WCA performed at step 212 (FIG. 3) does not meet the wireless service provider specifications, then the method 200 proceeds to step 218. At step 218, a network augment analysis is performed. The network augment analysis is described in detail with reference to FIG. 5.

Figure 5:
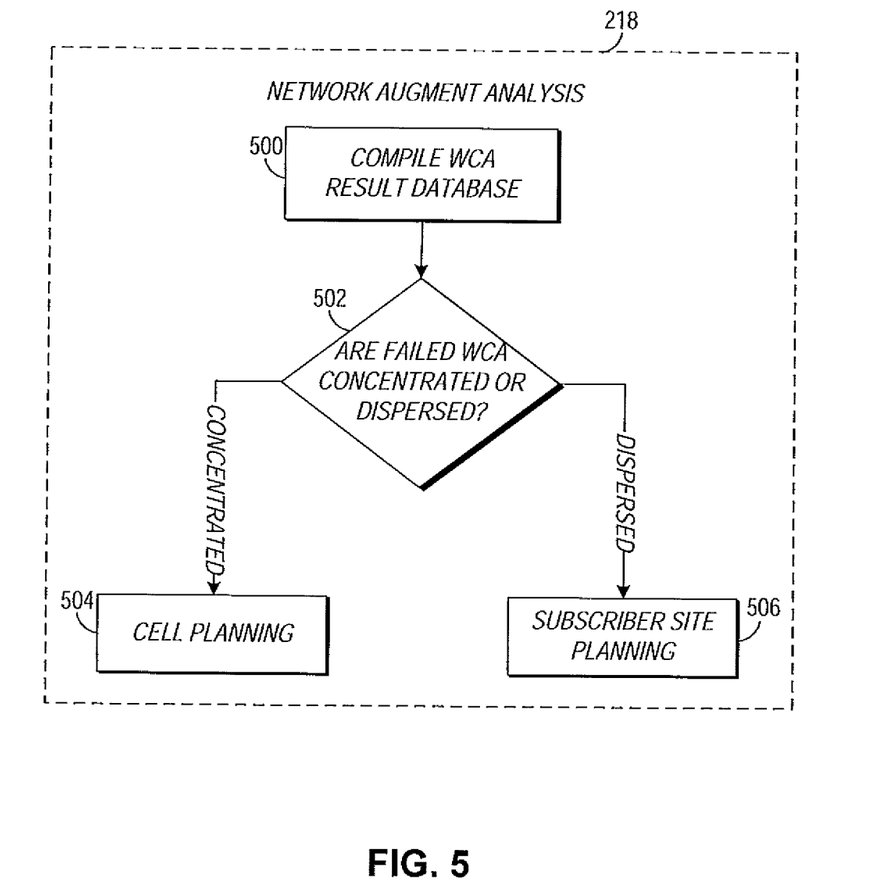
FIG. 5 illustrates an exemplary flow diagram of a network augment analysis, according to the present invention.

Referring now to FIG. 5, the network augment analysis step 218 is illustrated. The first step 500 of a network augment analysis is to compile a database of the WCA results. The failed results such as those that cause the network augment analysis to be performed can be logically stored in the database based upon subscriber name, subscriber address, subscriber account status, and/or subscriber location, for example. After the result database is compiled in step 500, the analysis proceeds to decision step 502. At decision step 502, a determination is made as to whether the failed WCA results are from subscribers that are concentrated or dispersed in the current network topology. If the subscribers are concentrated, then additional cell planning may be necessary as prescribed in step 504. If the subscribers are dispersed, then subscriber site planning may be needed as prescribed in step 506. Step 504 and step 506 are described in greater detail below.

Cell planning in step 504 can include an increase in power to particular cells which serve the subscribers in question. In some instances, the addition of one or more cell sites may be necessary to provide sufficient network resources to support exclusive wireless services for these subscribers.

Subscriber site planning in step 506 can include offering dual mode services (e.g., IEEE 802.11x (WiFi) and a 2G/3G wireless technology), installing a signal amplifier, installing a signal filter, or providing another solution at the subscriber's service address.

Referring back to FIG. 2, the method 200 proceeds to step 216 after the network augment analysis at step 218. At step 216, a value added analysis is performed. After step 216, the method 200 proceeds to decision step 220 and it is determined if a mutual benefit exists in providing the subscriber with exclusive wireless services. If it is determined at step 220 that a mutual benefit does exist, then the method 200 proceeds to step 222 and a value added proposal is generated. The thresholds to verify a mutually beneficial scenario can be set by the wireless service provider and may be enforced via a software program, for example. The value added proposal step 222 is described in detail with reference to FIG. 6.

Figure 6:
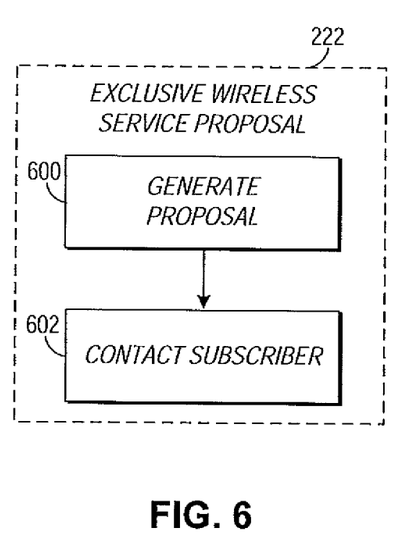
FIG. 6 illustrates an exemplary flow diagram for generating and providing a value added proposal to a subscriber, according to the present invention.

Referring now to FIG. 6, the value added proposal step 222 consists of generating an exclusive wireless service proposal at step 600 and to contact the subscriber at step 602. Generation of the value added proposal can be performed by the wireless service provider and/or a third party. The proposal can be provided to the subscriber via an email, a standard mail, a text message, a multimedia message, a bill insert, a call, or a like method. The proposal can contain a comparison of the subscriber's service address voice performance and quality to a typical wireline solution. In some embodiments, the comparison may be made directly to the subscriber's current wireline solution. The proposal can also contain a comparison of the subscriber's service address data performance and quality to a typical wireline solution such as dial-up, DSL, cable, or the like, and/or a comparison of 2G, 3G, and/or higher generation wireless data solutions. In addition, the subscriber's current cost associated with their wireline or wireline/wireless solution can be compared to an exclusive wireless solution.

Referring back to FIG. 2, the method ends at step 224 after the exclusive wireless service proposal is generated and provided to the subscriber at step 222 (FIG. 6). If at step 220 it is determined that a mutual benefit does not exist, then the method 200 proceeds to step 226. At step 226, the subscriber profile criteria is tuned to improve the hit rate by tuning thresholds for profile attributes such as, but not limited to account in good standing; significant off-peak usage; significant roaming usage; significant data usage (including messaging); and if a subscriber frequently (as determined by the wireless service provider) reaches or exceeds plan minutes. After the subscriber profile criteria are tuned in step 226, the method 200 proceeds to step 204 and the method 200 continues as described.

Figure 7:
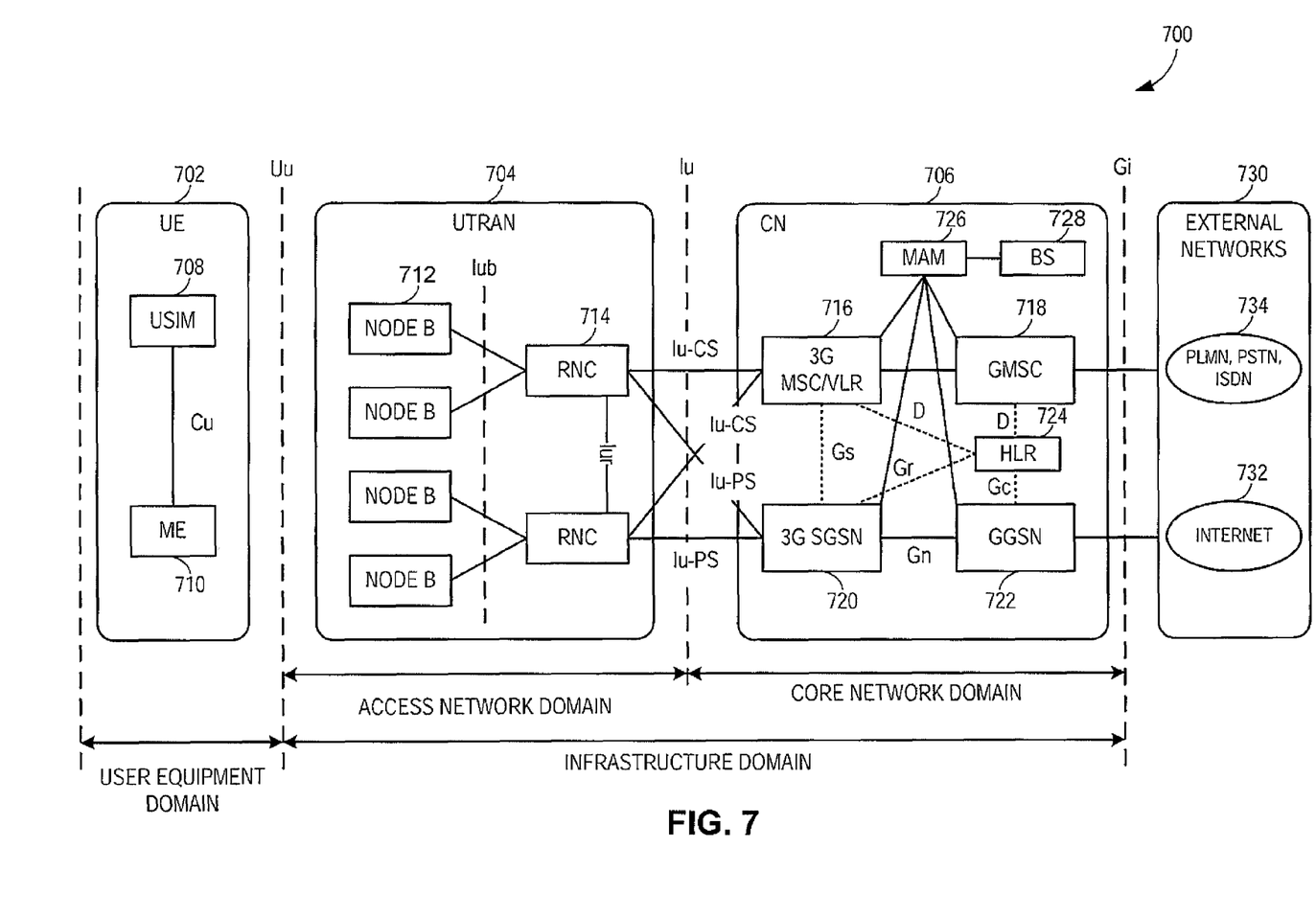
FIG. 7 illustrates an exemplary modified Universal Mobile Telecommunications System (UMTS) network, according to the present invention.

Referring now to FIG. 7, an exemplary Universal Mobile Telecommunications System (UMTS) network is shown, according to the present invention. The architecture is based on the 3GPP (Third Generation Partnership Project) Release 99 specification. However, it should be understood that the present invention can be applied to any UMTS telecommunications architecture, including by way of example, Release 5 (R5) and Release 6 (R6) 3GPP standards. In addition, the present invention can be applied to any wireless technology known to those skilled in the art. Accordingly, the exemplary UMTS network is provided as one exemplary embodiment in which the present invention may be practiced.

UMTS offers telecommunications services (e.g., voice and data service) and bearer services, which provide the capability for data transfer between access points. Negotiation and renegotiation of the characteristics of a bearer service can be performed at session or connection establishment, and during an ongoing session or connection. Both connection oriented and connectionless services can be offered for point-to-point and point-to-multipoint communications.

The following frequencies 1885-2025 MHz and 2110-2200 MHz can be allocated for UMTS use. However, the present invention described herein can also be applied to other frequency bands. UMTS can be used in other cellular/PCS frequencies, for example, 825-849 MHz and 869-894 MHz, 1850-1910 MHz and 1930-1990 MHz. Bearer services can have different quality-of-service (QoS) parameters for maximum transfer delay, delay variation and bit error rate. Offered data rate targets are: 144 kbps satellite and rural outdoor; 384 kbps urban outdoor; and 2048 kbps indoor and low range outdoor.

UMTS network services can have different QoS classes for four types of traffic: conversational class (e.g., voice, video telephony, video gaming); streaming class (e.g., multimedia, video on demand, webcast); interactive class (e.g., web browsing, network gaming, database access); and background class (e.g., email, SMS, downloading).

UMTS can also support a virtual home environment, which is a concept for portability across network boundaries and between terminals in a personal service environment. Personal service environment includes users being consistently presented with the same personalized features, user interface customization and services in whatever network or terminal, wherever the user may be located. UMTS also includes network security and location based services.

It should be understood that the present invention is not limited to UMTS networks and instead can be implemented using other means for wireless communications such as wireless data communications such as, but not limited to, Time Division Multiple Access (TDMA), Global System for Mobile Communications (GSM), Code Division Multiple Access (CDMA), CDMA2000, Circuit-Switched Data (CSD), General Packet Radio Service (GPRS), High-Speed Circuit-Switched Data (HSCSD), Enhanced GPRS (EG-PRS), Enhance Data GSM Environment (EDGEW), Evolution-Data Optimized (EV-DO), High-Speed Downlink Packet Access (HSDPA), High-Speed Uplink Packet Access (HSDPA), High-Speed Orthogonal Frequency-Division Multiplexing (OFDM) Packet Access (HSOPA), or combinations, variations, and/or improvements thereof, and the like.

The illustrated UMTS network 700 can consist of three interacting domains; a user equipment (UE) domain 702, a UMTS Terrestrial Radio Access Network (UTRAN) domain 704, and a core network (CN) domain 706. The UTRAN domain 704 is also referred to as the access network domain and the CN 706 is referred to as the core network domain, the both of which comprise an infrastructure domain.

The UE domain 702 includes a USIM (user services identity module) domain and an ME (mobile equipment) domain. User equipment is the equipment used by the user to access UMTS services. In one embodiment, the UE includes computer-readable memory which can include measurement software to obtain measurements for use by a measurement analysis machine (MAM) 726. The MAM 726 is described in greater detail below. In the UE domain 702, the UMTS IC card is the USIM 708 which has the same physical characteristics as a GSM SIM (subscriber identity module) card. The USIM interfaces to ME 710 via a Cu reference point. Functions of the USIM include: support of one USIM application (and optionally, more than one); support of one or more user profiles on the USIM; update of USIM specific information over the air; security functions; user authentication; optional inclusion of payment methods; and optional secure downloading of new applications such as a measurement application.

UE terminals work as an air interface counter part for Node-B devices of the access network and have many different types of identities. Following are some of the UMTS identity types, which are taken directly from GSM specifications: international mobile subscriber identity (IMSI); temporary mobile subscriber identity (TMSI); packet temporary mobile subscriber identity (P-TMSI); temporary logical link identity (TLLI); mobile station ISDN (MSISDN); international mobile station equipment identity (IMEI); and international mobile station equipment identity and software version number (IMEISV).

A UMTS mobile station (MS) can operate in one of three modes of operation. A PS/CS mode of operation is where the MS is attached to both the PS (packet-switched) domain and CS (circuit-switched) domain, and the MS is capable of simultaneously operating PS services and CS services. A PS mode of operation is where the MS is attached to the PS domain only, and can only operate services of the PS domain. However, this does not prevent CS-like services from being offered over the PS domain (e.g., VoIP). In a third CS mode of operation, the MS is attached to the CS domain only, and can only operate services of the CS domain.

The UTRAN 704 provides the air interface access method for the UE domain 702. The reference point between the UE domain and the infrastructure domain is the Uu UMTS radio interface. The access network domain provides the physical entities that manage resources of the access network and facilitates access to the core network domain. In UMTS terminology, a base station of the access network domain is referred to as a Node-B device 712, and control equipment for Node-B devices is called a radio network controller (RNC) 714. The interface between the Node-B device and the RNC 714 is the Iub interface. The interface between two RNCs is called the Iur interface.

The functions of Node-B devices include: air interface transmission/reception; modulation and demodulation; CDMA (Code Division Multiple Access) physical channel coding; micro diversity; error handing; and closed loop power control. The functions of the RNC include: radio resource control; admission control; channel allocation; power control settings; handover control; macro diversity; ciphering; segmentation and reassembly; broadcast signaling; and open loop power control.

Wideband CDMA (WCDMA) technology was selected for UTRAN air interface. UMTS WCDMA is a direct sequence CDMA system where user data is multiplied with quasi-random bits derived from WCDMA spreading codes. In UMTS, in addition to channelization, codes are used for synchronization and scrambling. WCDMA has two basic modes of operation: frequency division duplex (FDD) and time division duplex (TDD).

The Core Network (CN) 706 is divided in circuit-switched and packet-switched domains. Some of the circuit-switched elements are an MSC/VLR 716, and a GMSC 718. Packet-switched elements include a serving GPRS support node (SGSN) 720 and gateway GPRS support node (GGSN) 722. Some network elements such as an EIR (equipment identity register) (not shown), HLR (home location register) 724, VLR and AuC (authentication center) (not shown) can be shared by both domains.

A function of the CN 706 is to provide switching, routing and transit for user traffic. In particular, with regard to the present invention, the illustrated CN 706 also includes a measurement analysis machine (MAM) 726. The MAM 726 is configured to receive and analyze subscriber data; schedule measurement/survey sessions; provide instructions to the UTRAN 704 to conduct measurement/survey sessions; receive measurement data; create trace calls; perform wireless capability analysis; perform value added analysis; perform network augment analysis; determine mutual benefit; and generate exclusive wireless service proposals. The MAM 726 is illustrated as a single network component; however, in implementation the MAM 726 may be divided into two or more network components which may be designed to perform one or more of the aforementioned functions. In addition, the MAM 726 can include databases for storing subscriber data, analysis results, and other pertinent data. The MAM 726 is in communication with a billing system (BS) 728. The BS 728 performs billing functions for the UMTS network 700. With regard to the present invention, the BS 728 is additionally used to maintain subscriber contracts, subscriber account statuses, and subscriber usage patterns (e.g., off-peak, roaming, data, and overage).

The CN 706 also contains the databases and network management functions. The basic CN architecture for UMTS is based on the GSM network with GPRS (general packet radio service) capability. All equipment is modified for UMTS operation and services, The radio access network has several interfaces which can be configured and dimensioned. The CN 706 interfaces to the radio access domain via an Iu interface. An Iu-CS (circuit-switched) reference point interfaces an RNC of the access network to the MSC/VLR entity 716 of the CN 706 for voice from/to the MSC/VLR 716. An Iu-PS (packet-switched) reference point interfaces an RNC of the access network to the SGSN entity 720 of the CN 706 for data from/to the SGSN 720.

In the CN 706, a Gs interface is provided between the MSC/VLR 716 and the SGSN 720. A Gn interface is provided between the SGSN 720 and the GGSN 722. A D interface is provided between the MSC/VLR 716 and the HLR 724, and the HLR 724 and the GMSC 718. A Gr interface is provided between the SGSN 720 and the HLR 724. A Gc interface is provided between the GGSN 722 and the HLR 724.

The CN 706 provides the interface from the UE domain 702 to external networks 730 such as the Internet 732 via a Gi interface from the GGSN 722, and other networks 734 via the GMSC 718, which can include a PLMN (public land mobile network), a PSTN, and an ISDN (integrated service digital network) networks.

Asynchronous Transfer Mode (ATM) is defined for UMTS core transmission. ATM Adaptation Layer type 2 (AAL2) handles circuit-switched connection, and packet connection protocol AAL5 is designed for data delivery.

The architecture of the CN 706 can change when new services and features are introduced. Number Portability Database (NPDB), for example, can be used to enable a user to change the network while keeping their old phone number. A gateway location register (GLR) can be employed to optimize the subscriber handling between network boundaries. Additionally, the MSC/VLR 716 and SGSN 720 can merge to become a UMTS MSC.

The disclosed invention finds application to EDGE (Enhanced Data rates for GSM Evolution) technology. EDGE is presently the final stage in the evolution of the GSM standard, and uses a new modulation schema to enable theoretical data speeds of up to 384 Kbps within the existing GSM spectrum. EDGE is an alternative upgrade path towards 3G services for operators, without access to a new spectrum.

The architecture of the invention also finds application to a hierarchical cell structure (HCS). HCS is the architecture of a multi-layered cellular network where subscribers are handed over from a macrocell to a microcell, and even further, to a picocell, depending on the current network capacity and the needs of the subscriber.

Figure 8:
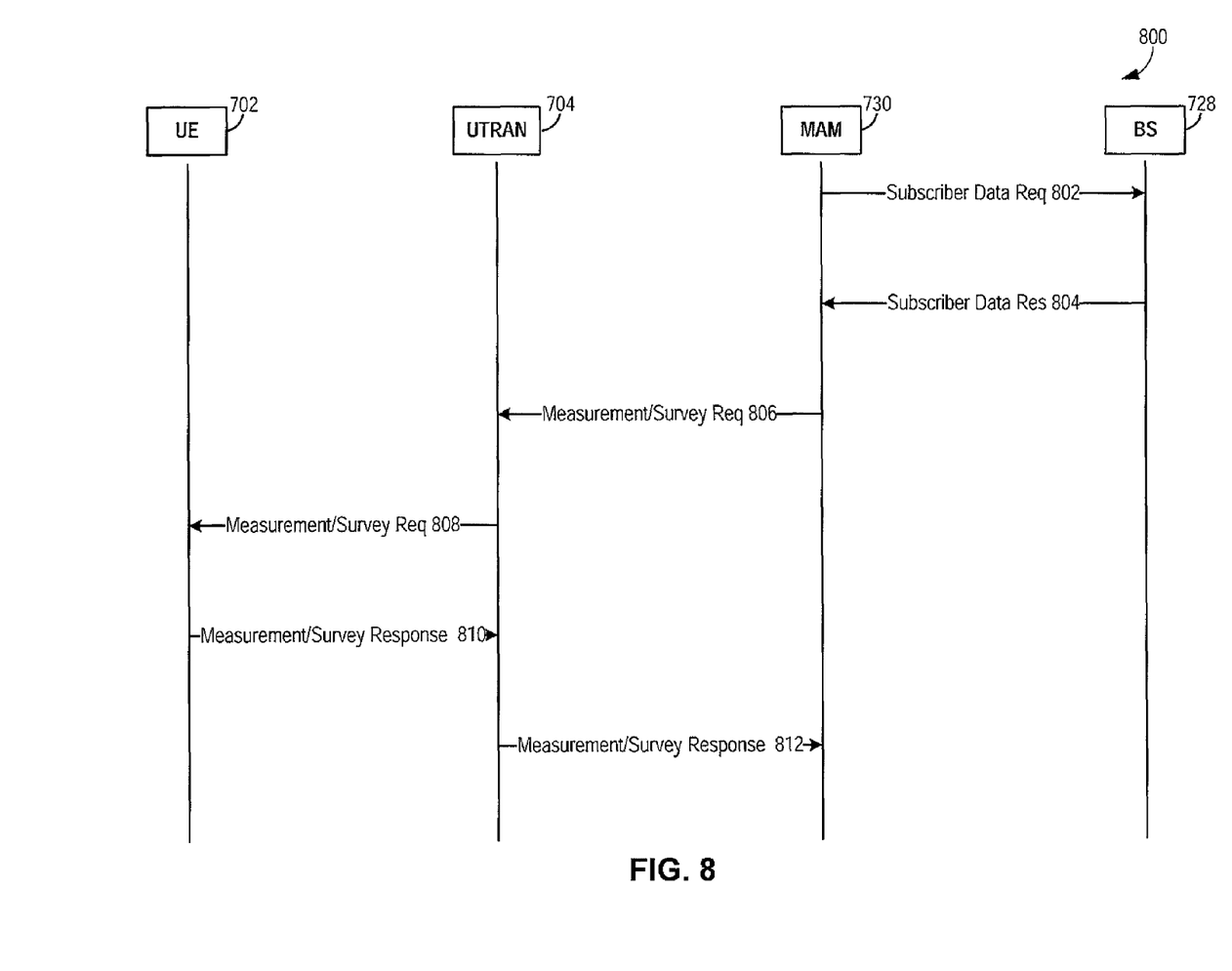
FIG. 8 illustrates an exemplary call flow diagram for obtaining measurement data from a mobile device in order to generate an exclusive wireless service proposal, according to the present invention.

Referring now to FIG. 8, an exemplary call flow diagram 800 for obtaining measurement data from a mobile device in order to generate an exclusive wireless proposal is shown, according to the present invention. The exemplary call flow diagram 800 is described for a current wireless subscriber. The illustrated call flow diagram 800 includes a UE 702, a UTRAN 704, a MAM 730, and a BS 728, each of which are described in detail with reference to FIG. 7. Call flow messages transmitted among these components is now described.

A subscriber data request 802 is generated at the MAM 730 and sent to the BS 728. The subscriber data request 802 can be configured to request data for a particular subscriber. Alternatively, the subscriber data request 802 can be configured to target subscribers that fall within a specific profile. The subscriber data request 802 can include a query for data regarding subscriber contract standing, subscriber rate plans, subscriber usage patterns (e.g., off-peak, roaming, data, overage), and other pertinent data.

After the BS 728 receives the subscriber data request 802, the BS 728 retrieves the requested data and generates a corresponding subscriber data response 804. The subscriber data response 804 is then sent to the MAM 730. The MAM 730 receives the subscriber data response 804 and stores the subscriber data for later use. It should be understood that in some instances, the MAM 730 already has the subscriber data information needed to schedule a measurement and/or survey session. (Note: call flow messages for measurement/survey session scheduling are not shown.)

The MAM 730 then generates a measurement/survey request 806. A measurement request and a survey request can be sent separately. The measurement/survey request 806 is received by the UTRAN 704, and more specifically, the RNC 714 (FIG. 7). The RNC 714 can then forward the measurement/survey request 806 to the appropriate Node B 712 (also FIG. 7), which in turn can forward the request 806 to the target UE 702 as shown by measurement/survey request 808.

As previously described, the UE 702 can include measurement software which can be triggered upon receipt of the measurement/survey request 808. Measurement data including, but not limited to, signal quality, signal strength, and data throughput can be obtained via the measurement software and provided to the UTRAN 704 in a measurement/survey response 810. The measurement/survey response 812 is sent from the UTRAN 704 to the MAM 730.

In an alternative embodiment, a call trace method is used to obtain measurement data and thusly measurement software installed on the UE 702 is not needed. In another alternative embodiment, a mobile assisted handover measurement report is used to actively report signal strength and data throughput via in-call reporting. In addition, subjective measurements of voice quality (overall call quality) may be conducted.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, comprising:
   calculating, at a tangible computing device comprising a processor, based upon an analysis of signal strength measurement data obtained via measurements of signal strength at a service address of a user, an increase in signal strength that would result from the user using exclusively wireless communications services at the service address as compared to using various communications services at the service address,
   determining a benefit based on the increase in signal strength, and
   providing a notification of the benefit for receipt by the user to promote use, by the user, exclusively of wireless communications services at the service address.

2. The method of claim 1, wherein the benefit comprises at least one benefit selected from a group of benefits consisting of:
   an increased-mobility benefit for the user;
   a continuous-connectivity benefit for the user;
   a subscriber benefit;
   a wireless-only service benefit;
   a subscriber-cost benefit; and
   a superior-data-rates benefit for the user.

3. The method of claim 1, wherein calculating the signal strength comprises calculating the signal strength based upon the analysis of the signal strength measurement data obtained via the measurements of signal strength during a measurement session.

4. The method of claim 3, wherein determining the signal strength comprises determining the signal strength based upon the analysis of signal strength measurement data obtained via the signal strength measurements during the measurement session wherein the measurement session includes a remotely-conducted measurement session performed over a time period during which the user is at the service address.

5. The method of claim 4, further comprising obtaining the time period during which the user is at the service address using a survey provided to the user prior to calculating the increase in signal strength.

6. The method of claim 4, further comprising determining, prior to calculating the increase in signal strength, the time period during which the user is at the service address using a location-determining technique.

7. The method of claim 3, wherein calculating the increase in signal strength based upon the analysis comprises calculating the increase in signal strength based upon the analysis of signal strength measurement data obtained in at least one predetermined session selected from group of predetermined sessions consisting of:
   a mobile-communication-device-based measurement session; and
   a network-based measurement session.

8. The method of claim 1, wherein:
   the wireless communications service is a first wireless communications service of the various communications services; and
   providing the notification comprises providing a wireless service proposal comprising:
      the benefit; and
      information indicating results of at least one comparison selected from a group of comparisons consisting of:
         a comparison of voice-related characteristics of the first wireless communications service at the service address to a wireline communications service available at the service address;
         a comparison of voice-related characteristics of the first wireless communications service at the service address to a wireline communications service, of the various communications services, to which the user is currently subscribed at the address;
         a comparison of data-related characteristics of the first wireless communications service at the service address to the wireline communications service available at the service address;
         a comparison of data-related characteristics of the first wireless communications service at the service address to the wireline communications service, of the various communications services, to which the user is currently subscribed at the address; and
         a comparison of a current cost associated with a second wireless communications service, of the various communications services, to which the user is currently subscribed to at the address to a cost associated with the first wireless communications service.

9. A system, comprising:
   a processor; and
   a non-transitory computer-readable medium in operative communication with the processor and having stored thereon instructions that, when executed by the processor, cause the processor to perform operations comprising:
      calculating, based upon an analysis of signal strength measurement data obtained via measurements of signal strength at a service address of a user, an increase in signal strength that would result from the user using exclusively wireless communications services exclusively at the address as compared to using various communications services at the address, determining a benefit based on the increase in signal strength;

and providing a notification of the benefit for receipt by the user to promote use, by the user, exclusively of wireless communications services at the address.

10. The system of claim 9, wherein the benefit further comprises at least one benefit selected from a group of benefits consisting of:

an increased-mobility benefit for the user;
a continuous-connectivity benefit for the user;
a subscriber benefit;
a wireless-only service benefit;
a subscriber-cost benefit; and
a superior-data-rates benefit for the user.

11. The system of claim 9, wherein the operation of calculating the increase in signal strength comprises determining the benefit based upon the analysis of the signal strength measurement data obtained via the measurements of signal strength during a measurement session.

12. The system of claim 11, wherein the operation of calculating the increase in signal strength comprises calculating the increase in signal strength based upon the analysis of signal strength measurement data obtained via the measurements of signal strength during the measurement session wherein the measurement session comprises a remotely-conducted measurement session performed over a time period during which the user is at the service address.

13. The system of claim 12, wherein the operations further comprise obtaining, prior to calculating the increase in signal strength, the time period during which the user is at the service address using a survey provided to the user.

14. The system of claim 12, wherein the operations further comprise determining, prior to calculating the increase in signal strength, the time period during which the user is at the service address using a location-determining technique.

15. The system of claim 11, wherein the operations further comprise calculating the increase in signal strength based upon the analysis of signal strength measurement data obtained in at least one predetermined session selected from a group of predetermined sessions consisting of:

a mobile-communication-device-based measurement session; and
a network-based measurement session.

16. The system of claim 9, wherein:

the wireless communications service is a first wireless communications service of the various communications services; and the operation of providing the notification comprises providing a wireless service proposal comprising:

the benefit; and information indicating results of at least one comparison selected from a group of comparisons consisting of:

a comparison of voice-related characteristics of the first wireless communications service at the service address to a wireline communications service available at the service address;

a comparison of voice-related characteristics of the wireless communications service at the service address to a wireline communications service, of the various communications services, to which the user is currently subscribed at the address;

a comparison of data-related characteristics of the wireless communications service at the service address to the wireline communications service also available at the service address;

a comparison of data-related characteristics of the wireless communications service at the service address to the wireline communications service, of the various communications services, to which the user is currently subscribed at the address; and a comparison of a current cost associated with a second wireless communications service, of the various communications services, to which the user is currently subscribed at the address to a cost of the first wireless communications service.

17. A non-transitory computer-readable storage medium having stored thereon computer-executable instructions that, when executed by a processor, cause the processor to perform multiple operations, the operations comprising:

calculating, based upon an analysis of signal strength measurement data obtained via measurements of signal strength at a service address of a user, an increase in signal strength that would result from the user using exclusively wireless communications services at the service address as compared to using various communications services at the service address, determining a benefit based on the increase in signal strength;

and providing a notification of the benefit for receipt by the user to promote use, by the user, of wireless communications services exclusively at the service address.

18. The non-transitory computer-readable storage medium of claim 17, wherein the operation of calculating the increase in signal strength comprises calculating the increase in signal strength based upon the analysis of the signal strength measurement data obtained via the measurements of signal strength during a measurement session.

19. The non-transitory computer-readable storage medium of claim 18, wherein the operation of calculating the increase in signal strength comprises calculating the increase in signal strength based upon the analysis of signal strength measurement data obtained via the measurements of signal strength during the measurement session;

wherein the measurement session comprises a remotely-conducted measurement session performed over a time period during which the user is at the service address.

20. The non-transitory computer-readable storage medium of claim 18, wherein the operation of calculating the increase in signal strength comprises calculating the increase in signal strength based upon the analysis of signal strength measurement data obtained in at least one of predetermined session selected from a group of predetermined sessions consisting of:

a mobile-communication-device-based measurement session; and
a network-based measurement session.

21. The non-transitory computer-readable storage medium of claim 17, wherein the operations further comprise:

obtaining, prior to calculating the increase in signal strength the time period during which the user is at the service address; and calculating the increase in signal strength comprises conducting a remote measurement session during the time period during which the user is at the service address.

22. The non-transitory computer-readable storage medium of claim 21, wherein obtaining the time period during which the user is at the service address comprises obtaining the time period based on a user response to a survey.

23. The non-transitory computer-readable storage medium of claim 21, wherein obtaining the time period during which the user is at the service address comprises obtaining the time period using a location-determining technique.

\* \* \* \* \*